(12) United States Patent
Imani et al.

(10) Patent No.: US 12,347,307 B2
(45) Date of Patent: Jul. 1, 2025

(54) REMOTE CONTROL FOR FLASH DEVICE

(71) Applicant: Profoto Aktiebolag, Sundbyberg (SE)

(72) Inventors: Mazda Imani, Sunbyberg (SE); Mathias Nord, Sollentuna (SE); Anton Falk, Huddinge (SE); Göran Maren, Vendelsö (SE); Emanuel Schütt, Farsta (SE)

(73) Assignee: Profoto Aktiebolag, Sundbyberg (SE)

( * ) Notice: Subject to any disclaimer, the term of this patent is extended or adjusted under 35 U.S.C. 154(b) by 118 days.

(21) Appl. No.: 18/334,027

(22) Filed: Jun. 13, 2023

(65) Prior Publication Data

US 2023/0410640 A1 Dec. 21, 2023

(30) Foreign Application Priority Data

Jun. 20, 2022 (SE) .................................. 2250750-3

(51) Int. Cl.
*G08C 17/02* (2006.01)
*G03B 15/05* (2021.01)
*H05B 47/19* (2020.01)

(52) U.S. Cl.
CPC ............ *G08C 17/02* (2013.01); *G03B 15/05* (2013.01); *H05B 47/19* (2020.01);
(Continued)

(58) Field of Classification Search
CPC ............ G03B 15/05; G03B 2215/0557; G03B 2215/0546; G08C 17/02; H05B 7/19
See application file for complete search history.

(56) References Cited

U.S. PATENT DOCUMENTS

2010/0165178 A1 7/2010 Chou et al.
2012/0033959 A1 2/2012 King
(Continued)

FOREIGN PATENT DOCUMENTS

EP 3249462 A1 11/2017
WO WO 2015/047150 A1 4/2015

OTHER PUBLICATIONS

Swedish Search Report for Swedish Patent Application No. 2250750-3, dated Jan. 31, 2023, in 3 pages.

*Primary Examiner* — Minh Q Phan
(74) *Attorney, Agent, or Firm* — Knobbe, Martens, Olson & Bear, LLP (57) ABSTRACT

A remote control is described for controlling at least one group of flash devices for photography. The remote control is configured to send a pre-flash trigger signal, $T_{PF}$, to the flash devices for initiating a pre-flash (PF), and to receive, from the camera, a flash adjustment value, VA. The remote control comprises a display and is configured to determine a main flash strength value, $V_{MF}$, based on a pre-flash strength value, $V_{PF}$, stored in the remote control, the flash adjustment value, VA, and a predetermined relationship between the pre-flash strength value, $V_{PF}$, the flash adjustment value, VA, and the main flash strength value, $V_{MF}$. The remote control displays the main flash strength value, $V_{MF}$, on a display and sends a wireless main flash trigger signal, $T_{MF}$, to the flash devices, for initiating a main flash, MF, with adjusted flash strengths.

20 Claims, 3 Drawing Sheets

(52) U.S. Cl.
CPC ............... *G03B 2215/0546* (2013.01); *G03B 2215/0557* (2013.01); *G08C 2201/93* (2013.01)

(56) References Cited

U.S. PATENT DOCUMENTS

| 2014/0099091 A1* | 4/2014 | King | G03B 15/05 |
| | | | 396/164 |
| 2015/0008847 A1* | 1/2015 | Li | G03B 15/05 |
| | | | 315/294 |

\* cited by examiner

REMOTE CONTROL FOR FLASH DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

A remote control for controlling at least one group of flash devices for photography. The remote control is configured for controlling the strength of flashes from the flash devices.

Description of the Related Art

Flash devices are used extensively for photography. For recreational photography, a camera with a built-in flash is usually used. For professional photography one or more external flashes is usually used. To achieve the correct illumination of the scene during image capture it is common to perform an exposure measurement when the scene is illuminated with a preflash. The strength of the preflash is sometimes preset from the factory. Based on the exposure measurement the camera determines whether the amount of light from the flash should be increased or decreased. Usually, the strength of the flash is changed in steps, wherein each step corresponds to a doubling of the energy in the flash.

When capturing an image of a scene with flash light it is common to use more than one flash device arranged in one or more groups. When the flash devices are arranged in two or more groups, the different groups are usually arranged to illuminate different parts of the scene. With the current remote controls for flash devices, it is possible for the photographer to change the balance between the strength of flashes from the different groups of flash devices.

SUMMARY

With the systems of a remote control and flash devices, it is difficult to know if the flash devices are already at their minimum or maximum strength when changing the balance between the strength of flashes from the different groups of flash devices. Thus, it is difficult to know whether a manual adjustment will take effect or not.

An object of the present disclosure is to provide a remote control controlling at least one group of flash devices for photography, which is configured for controlling the strength of flashes from the flash devices, and which provides information to a user on whether the flashes may provide flashes with the necessary strength or not.

According to a first aspect of the present disclosure, a remote control for controlling at least one group of flash devices for photography is provided. The remote control is configured to send, after receiving a trigger signal TC from a camera, a wireless pre-flash trigger signal, TPF, to the flash devices for initiating a pre-flash from the flash devices. Each flash device has a preset pre-flash strength, EPF, and the sum of all pre-flash strengths, EPF, corresponds to a total pre-flash strength ETPF. The remote control is configured to receive from the camera, after sending the pre-flash trigger signal, TPF, a flash adjustment value, VA, corresponding to the exponent in the relationship $E_{DMF}=E_{TPF} \cdot X^{VA}$, wherein EDMF is a desired sum of main flash strengths from the flash devices, and X is a predetermined factor. The remote control is characterised in that the remote control comprises a display and is configured to determine a main flash strength value, VMF, based on a pre-flash strength value, VPF, stored in the remote control, the flash adjustment value VA, and a predetermined relationship between the pre-flash strength value, VPF, the flash adjustment value, VA, and the main flash strength value, VMF. The remote control is also characterized in that it is configured, to display the main flash strength value, VMF, on the display and to send a wireless control signal, SC, to each flash device for adjustment of the flash strength from each flash device at least according to the flash adjustment value, VA, and to send a wireless main flash trigger signal, TMF, to the flash devices, for initiating a main flash, MF, with the adjusted flash strength, from each flash device.

Typically, a main flash camera trigger signal is transmitted from the camera at a predetermined time after sending of the trigger signal TC from the camera. The remote control sends the main flash trigger signal after reception of any such main flash camera trigger signal.

The wireless control signal, SC, sent to each flash device for adjustment of the flash strength from each flash device at least according to the flash adjustment value, VA, may be sent using broadcasting. In case the information to the different groups of flash devices is different, the broadcasted signal has to comprise information identifying each group of flash devices.

The reception of a trigger signal from a camera and the initiation of a pre-flash from the flash devices is the start of a through-the-lens, TTL, light measurement by the camera. The camera measures the light from a scene of which a picture is to be recorded by the camera. The preset pre-flash strength from each flash device may be preset at the factory or preset by a user. The camera determines how much the light has to be increased or decreased and determines a flash adjustment value that defines a factor with which the strength of the flashes from the flash devices have to be increased or decreased in the relationship $E_{DMF}=E_{TPF} \cdot X^{VA}$. In the field of photography, it is common to use the term exposure value for defining the relationship between light, detector sensitivity, aperture size, and exposure time. A factor of 2 may differ between two different exposure values. Thus, it is common to use a factor of 2 also for the definition of the flash adjustment value, VA, i.e., to have X=2. It is, however, possible to use another factor than 2 for X.

The flash devices according to the present disclosure are flash devices, which are separate from the camera.

The at least one group of flash devices comprises at least one flash device.

The pre-flash strength value stored in the remote control can relate to the pre-flash strength of the flash devices for best technical effect of the remote control. The pre-flash strength, EPF, of each flash device is related to the maximum flash strength, Emax, of each flash device as $$E_{PF}=E_{max} \cdot X^{-Y},$$

wherein Y is a predetermined number for each flash device. The remote control is used with flashes, which all have a common relationship between pre-flash strength, $E_{PF}$, and the maximum flash strength, $E_{max}$, as $E_{PF}=E_{max} \cdot X^{-N}$, wherein N is a common number for all flash devices. As exemplified above the factor X may be chosen to be equal to 2.

The predetermined number N is also stored in the flash device and is related to the preferred flash devices as defined above.

The preset pre-flash strength, EPF, may be different for different flash devices. Flash strength may be measured in Joules. If a first flash has a pre-flash strength of 1 Joule and a second flash has a pre-flash strength of 10 Joule. These preflash strengths corresponds to the pre-flash value, VPF. The total pre-flash strength, ETPF, is 1+10=11 Joule. If the flash adjustment value received from the camera is 2, this means that the desired sum of main flash strengths from the flash devices is $E_{DMF}=E_{TPF} \cdot X^{VA}=11 \cdot 2^2$, i.e., 44 joule, in case X=2.

The sending of wireless control signal to said at least one group of flash devices may be done in many different ways. According to one example, the remote control may send information on the number of steps from the pre-flash strength that the flash strength should be adjusted. If only the flash adjustment value, VA, is to be taken into account, the control signal may comprise the sending of the flash adjustment value, VA, to the flash devices. According to other embodiments, the control signal sent to the flash devices may comprise the main flash strength value. Depending on the size of the flash adjustment value, the adjustment may be possible or not.

The equations in the description above are not stored in the remote control but are used only as an explanation of the relationship between the terms.

The remote control according to the first aspect makes it possible for a user to determine how much the strength of the flashes may be adjusted.

The predetermined relationship between the pre-flash strength value, VPF, the flash adjustment value, VA, and the main flash strength value, VMF, may be VMF=VPF+VA. Such a relationship is adapted to the factors used for exposure values commonly used within the field of photography and would mean than an increase of 1 of the main flash value corresponds to an increase by a factor of X, i.e., a factor of 2 if X=2.

The remote control may be configured to initiate an alert signal when the flash adjustment value, VA, is larger than a predetermined value, N, stored in the remote control. The alert signal may be implemented in many different ways as a sound signal and/or a visual signal. The predetermined value may be such that it corresponds to a maximum flash strength. Such an alert signal informs a user on that the desired flash strength is not possible to obtain.

The remote control may comprise a user interface, wherein the remote control is configured to receive, via the user interface, a user value, VU, for each group of flash devices, wherein each user value VU corresponds to the second exponent in the relationship $E_{AMF}=E_{PF} \cdot X^{VA+VU}$, wherein EMF is a main flash strength for a flash device in a group, after adjustment with the flash adjustment value, VA, and the user value for the group. The remote control may be configured to determine, for each group of flash devices, a main flash strength value, VMF, based on the pre-flash strength value, VPF, the flash adjustment value VA, the user value VU for the group, and a predetermined relationship between the pre-flash strength value, VPF, the flash adjustment value, VA, the main flash strength value, VMF, and the user value, VU, to display the main flash strength value, VMF, for each group, on the display, and to send a wireless control signal, SC, to each flash device for adjustment of the flash strength from each flash device according to the flash adjustment value, VA, and the user value, VU, for the group to which the flash device belongs.

The user value makes it possible to adjust the flash strength to achieve an exposure, which differs from the exposure determined by the camera and defined by the flash adjustment value VA. This is especially useful when having groups of flash devices, which are directed towards different parts of a scene to be imaged. With the remote control according to the disclosure herein, it is possible for a user to know whether the desired user value is possible or not. The wireless control signals, SC, to each flash device may comprise an identification number of the group and the sum of the flash adjustment value, VA, and the user value, VU, for the group. Thus, the number of different control signals is equal to the number of groups. The flash devices identifies the correct sum of the flash adjustment value, VA, and the user value, VU, by using the identification number. The flash devices may or may not be able to adjust the flash strength according to the sum of the flash adjustment value, VA, and the user value, VU, depending on the size of the sum of the flash adjustment value, VA, and the user value, VU.

The remote control may be configured to send the respective user value, VU, to each group of flash devices, before sending the wireless pre-flash trigger signal, TPF, to the flash devices. The respective user values may be sent using broadcasting. When broadcasting is used, the different groups have to be identified together with the respective user value, VU. By configuring the remote control in this way, all information sent after reception of the flash adjustment value is the same for all groups of flash devices. This minimizes the data that has to be processed between the sending of the pre-flash trigger signal and the sending of the main flash trigger signal. As the time between the pre-flash trigger signal and the main flash trigger signal is typically 60-70 milliseconds, it is advantageous to reduce the necessary information that has to be processed.

The remote control may be configured for communication with a mobile device and may be configured for reception of the user value VU from a mobile device. With such a remote control, a user may get information on whether it is possible to provide flashes from with the desired adjustment according to the user value.

The predetermined relationship between the pre-flash strength value, VPF, the flash adjustment value, VA, and the main flash strength value, VMF, may be VMF=VPF+VA+VU. Such a relationship is adapted to the factors used for exposure values commonly used within the field of photography and would mean than an increase of 1 of the main flash value corresponds to an increase by a factor of X, i.e., a factor of 2 if X=2.

The remote control may be configured to display on the display, for each group of flash devices, also the user value, VU. This makes it easier for a user to achieve the desired exposure as the user value, VU, may be adjusted in case the main flash strength value is too high.

The remote control may be configured to initiate an alert signal when the sum of the flash adjustment value, VA, and the user value, VU, is larger than the predetermined value, N, for at least one group of flash devices. The alert signal may be implemented in many different ways as a sound signal and/or a visual signal. The predetermined value may be such that it corresponds to a maximum flash strength. Such an alert signal informs a user on that the desired flash strength is not possible to obtain.

The remote control may be configured to transmit to a mobile device the main flash strength value VMF. The remote control may be configured to transmit to a mobile device also the user value, VU, and/or the pre-flash strength value, VPF. This makes it easier for a user to control the exposure.

The predetermined value, N, may be set to 7. As described above the remote control can be used with flash devices having a pre-flash strength, which relates to the maximum flash strength of the flash devices according to $E_{PF}=E_{max} \cdot X^{-N}$. Thus, when the flash adjustment value, VA, or sum of the flash adjustment value, VA, and the user value, VU, reaches the predetermined value, N, the maximum flash strength has been reached. The value 7 is a practical choice and other values may be chosen.

The remote control may be configured to set the pre-flash strength value, VPF, based on input from a user via a user interface. The user interface may be the same as is used for input of the user value, VU, in case such an interface is present. It is of course also possible to have separate user interfaces. By making it possible for a user to set the pre-flash strength value, it is possible to adapt the remote control to the flash devices, which are controlled, by the remote control.

The pre-flash strength value, VPF, may be 3. In case the predetermined value is 7 this means that, the maximum flash strength from the flash devices correspond to a main flash strength value, $V_{MF}$, of 10. Flash devices with a pre-flash strength are quite common on the market. By pre-setting the preflash value, VPF, to 3 the remote control shows the same pre-flash value as a display on such flash devices.

Commonly used flash devices may have a pre-flash strength value, VPF, of 3, a maximum flash value of 10 and a minimum flash value of 1 or 0.1.

As described above a remote control according to the above description can be used for controlling at least one group of flash devices, wherein all flash devices have a pre-flash strength corresponding to the pre-flash strength value, i.e., the predetermined number of steps below the maximum flash strength of each flash device, wherein each step corresponds to the predetermined factor, X. The different flash devices may of course have different maximum flash strengths.

Methods of using the system(s) (including device(s), apparatus(es), assembly(ies), structure(s), and/or the like) disclosed herein are included; the methods of use can include using or assembling any one or more of the features disclosed herein to achieve functions and/or features of the system(s) as discussed in this disclosure. Methods of manufacturing the system(s) disclosed herein are included; the methods of manufacture can include providing, making, connecting, assembling, and/or installing any one or more of the features of the system(s) disclosed herein to achieve functions and/or features of the system(s) as discussed in this disclosure.

In the following embodiments will be described with reference to the appended drawings.

DETAILED DESCRIPTION

In the following description of embodiments, similar features in the different drawings will be denoted by the same reference numeral. The drawings are not drawn to scale.

Figure 1:
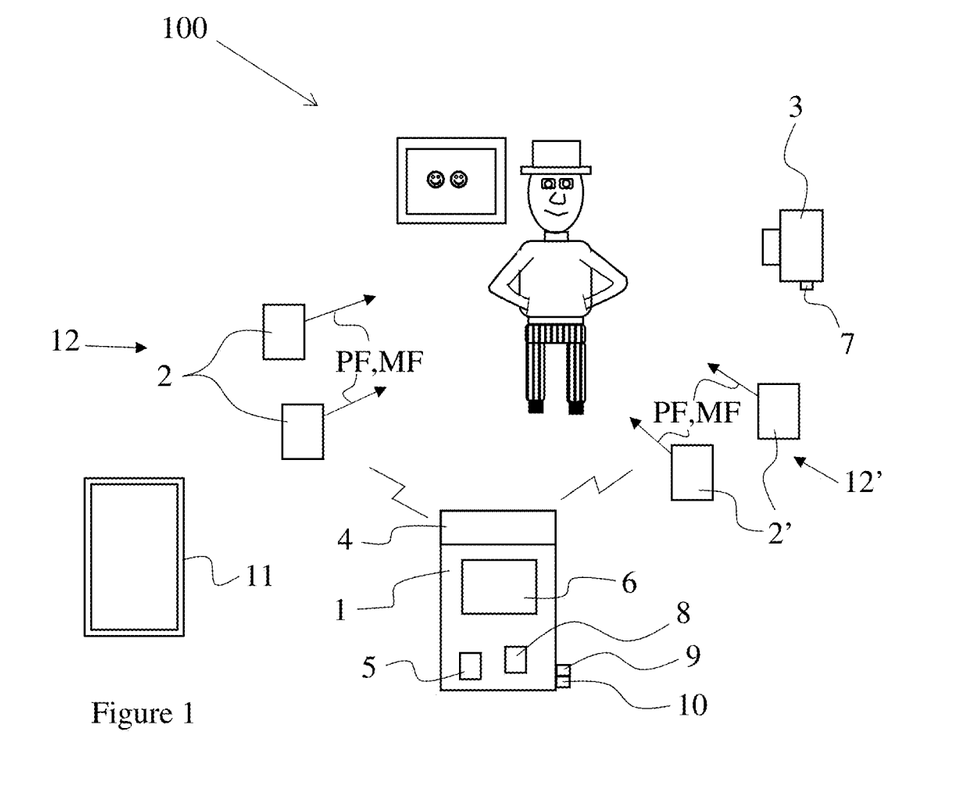
FIG. 1 shows a scene to be photographed, a camera, two groups of flash devices, a remote control according to an embodiment and a mobile device.

FIG. 1 shows a scene 100 of a person and a painting, of which a photograph is to be taken. FIG. 1 also shows two groups 12, 12', of flash devices with two flash devices 2, 2', in each group, a remote control 1 for controlling the flash devices 2, 2', and a camera 3 for capturing the photograph. The remote control 1 comprises a communication device 4 for wireless communication with the camera 3 and the flash devices 2, 2'. The camera may be connected by wire to the remote control. The remote control also comprises a display and an optional user interface 5 for input of information from a user and a display 6 for display of information regarding the flash strength from the flash devices 2, 2'. The remote control 1 also comprises a control unit 8, which controls the remote control 1.

When a photographer (not shown) is to capture an image of the scene 100 a trigger 7 on the camera 3 is actuated. The trigger 7 may be actuated electrically. When the trigger 7 is actuated the camera initiates a through-the-lens, TTL, sequence by sending a trigger signal TC to the remote control. When the remote control 1 has received the trigger signal TC from the camera 3, the remote control 1 sends a wireless pre-flash trigger signal, TPF, to the flash devices 2, 2' for initiating a pre-flash, PF, from the flash devices 2, 2'. Each flash device 2, 2', has a preset pre-flash strength, EPF, and the sum of all pre-flash strengths, EPF, corresponds to a total pre-flash strength ETPF. In FIG. 1 the pre-flash, PF, as well as a main flash, MF, are shown as arrows from the flash devices 2, 2'. The pre-flash strength may be set at the factory or may be set by the photographer. After having sent the pre-flash trigger signal, TPF, and the pre-flashes have been emitted, the camera 3 performs a light measurement to determine how much the light should be adjusted to provide a correct exposure of the image. Usually, in flash devices the relation between the strength of the pre-flash and the strength of the main flash is expressed as $E_{MF}=E_{PF} \cdot X^{VA}$, wherein EMF is the main flash strength, X is a predetermined factor and VA is a flash adjustment value. In cameras, the predetermined factor is usually 2. When a plurality of flash devices 2, 2', are used, the camera 3 determines the flash adjustment value, VA, in relation to the total pre-flash strength ETPF, for a desired sum of main flash strengths, EDMF, to be sufficiently strong and sends the flash adjustment value, VA, to the remote control 1. The remote control 1 receives the flash adjustment value, VA, and determines a main flash strength value, VMF, based on a pre-flash strength value, VPF, stored in the remote control 1, the flash adjustment value VA, and a predetermined relationship between the pre-flash strength value, VPF, the flash adjustment value, VA, and the main flash strength value, VMF. According to an embodiment the pre-flash strength value, VPF, may be set to an integer representing a number of steps below the maximum flash strength Emax of the flash devices 2, 2'. As an example, the maximum flash strength may be set to correspond to a value 10. The pre-flash strength value VPF may be set to be seven steps below the maximum flash strength Emax, wherein each step corresponds to a decrease of the flash strength by a factor of 2. Thus, the pre-flash strength value stored in the remote control 1 is set to 3. By either setting the pre-flash strength of all flash devices to seven steps below the maximum flash strength or by obtaining flash devices 2, 2', which are set from factory to have a pre-flash strength seven steps below the maximum flash strength, the strength of all flash devices may be increased by a factor of 27. The remote control can be used for controlling flash devices, which all have a pre-flash strength, which is a factor of XVA below the maximum flash strength. Expressed differently, the pre-flash strength, EPF, of each flash device is related to the maximum flash strength, Emax, of each flash device as $$E_{PF}=E_{max} \cdot X^{-N},$$

wherein N is a predetermined number. As exemplified above the factor X may be chosen to be equal to 2, but also other values may be chosen for the factor.

Optionally, the remote control 1 may determine whether the flash adjustment value is equal to or less than a predetermined value. The predetermined value may be chosen as the number of steps that the flash strength may be increased, i.e., 7. The comparison may be performed in many different ways. The flash adjustment value may be compared directly to the predetermined value, N. The flash adjustment value, VA, may be added to the pre-flash strength value VA and is then compared to the sum of the pre-flash strength value VA and the predetermined value, N. Other alternatives are also possible.

When the flash adjustment value, VA, is equal to or less than a predetermined value, N, the remote control displays the main flash strength value, VMF, on the display 6. However, the determination whether the flash adjustment value is equal to or less than a predetermined value N may be omitted and always display the main flash strength value, VMF, on the display 6. The remote control may send, optionally in dependence of the comparison, at least one main flash control signal to said at least one group of flash devices 2, 2', for initiating a main flash with a main flash strength, EMF, from each flash device. The at least one main flash control signal may comprise instructions to the flash devices to increase the strength from the pre-flash value by a factor of XVA, which in an example may be 2VA. As an example the received flash adjustment value VA may be 2.4, which is smaller than 7. Thus, the remote control 1 displays the sum of the pre-flash strength value VPF and the flash adjustment value VA, i.e., VMF=VPF+VA. The pre-flash strength value VPF may be set to 3 as in the example above and the predetermined value may be chosen as the number of steps that the flash strength may be increased, i.e., 7 in this example. Thus, in this example the sum VMF=VPF+VA corresponds to a sum of 3 and 2.4, which equates to 5.4. With these settings, it is easy for a photographer to understand the setting of the flashes as each step corresponds to a doubling of the flash strength. The remote control may according to an example send a control signal to the flash devices to increase the flash strength by a factor 2VA=22.4, by sending the flash adjustment value to the flash devices. After sending the control signal the remote control sends a wireless main flash trigger signal, TMF, to the flash devices 2, 2', for initiating a main flash, MF, with the adjusted flash strength, from each flash device 2, 2'. Almost all cameras send a main flash camera trigger signal TCMF a predetermined time after having sent the adjustment values VA. The remote control is adapted to send the main flash trigger signal, TMF, after reception of the main flash camera trigger signal TCMF. The time between the trigger signal TC and the main flash camera trigger signal TCMF depends on the camera but is typically 60-70 milliseconds for most cameras.

The described relationship may be modified in different ways. It would for example be possible to use a relationship as VMF=VPF+2×VA. The pre-flash strength value may be set to 10. The predetermined value may be chosen as the number of steps that the flash strength may be increased, i.e., 7 as in the example above. With such a relationship, the maximum of the main flash strength value would be 10+2×7, i.e., 24 before the flash devices.

When the flash adjustment value, VA, is larger than the predetermined value, N, this would correspond to a main flash strength above the maximum flash strength. In this case, the remote control may be configured to initiate an alert signal. The alert signal may be of many different kinds. As an example, the alert signal may be a light or sound signal from an optional illumination device 9 or an optional speaker 10. According to another example, the alert signal may be an error message on the display 6. Combinations of an error message on the display and light signals and sound signals are possible. When an alert signal is not initiated, the user may still understand that the flash device has reached its limit by having knowledge of the maximum flash strength value of the flash device. Thus, if a value of 12 is shown on the display of the remote control and the maximum flash value of the flash device is 10, the user understands that the desired flash strength may not be emitted from the flash device.

The predetermined relationship between the pre-flash strength value, VPF, the flash adjustment value, VA, and the main flash strength value, VMF, may, according to an embodiment be VMF=VPF+VA. The pre-flash strength value, VPF, may, according to an embodiment, be 3 and the predetermined number may be 7. This results in that the main flash strength value VMF=3+VA, wherein the maximum value for the main flash strength value VMF is 10.

As described above the remote control 1 may comprise an optional user interface 5 for input of information from a user for display of information regarding the flash strength from the flash devices 2, 2'. The remote control 1 may according to an one implementation be configured to receive, via the user interface, a user value VU for each group in the at least one group of flash devices, wherein each user value VU corresponds to the second exponent in the relationship $$E_{AMF}=E_{PF} \cdot X^{VA+VU},$$

wherein $E_{MF}$ is a main flash strength for a flash device in a group 12, 12', after adjustment with the flash adjustment value, VA, and the user value for the group 12, 12'. The remote control may further be configured to determine, for each group of flash devices, a main flash strength value, $V_{MF}$, based on the pre-flash strength value, $V_{PF}$, the flash adjustment value VA, the user value VU for the group 12, 12', and a predetermined relationship between the pre-flash strength value, $V_{PF}$, the flash adjustment value, VA, the main flash strength value, $V_{MF}$, and the user value, VU, and to display the main flash strength value, $V_{MF}$, for each group on the display. The remote control 1 is then configured send a wireless control signal, SC, to each flash device for adjustment of the flash strength from each flash device 2, 2' according to the flash adjustment value, VA, and the user value, VU, for the group 12, 12' to which the flash device belongs. This may be done by sending a control signal for each group comprising the sum of the flash adjustment value, VA, and the user value, VU, and an identification number identifying the respective groups. The flash devices are set to a specific group and identifies the control signal with the correct identification number.

As an alternative or in combination to sending a wireless control signal, SC, to each flash device for adjustment of the flash strength from each flash device 2, 2' according to the flash adjustment value, VA, and the user value, VU, for the group 12, 12' to which the flash device belongs the remote control may be configured as follows. After having received the user value, VU, for each group, the remote control 1, sends the user values to the respective groups 12, 12' of flash devices 2, 2'. Then, after having received the flash adjustment value, VA, from the camera, the remote control sends the wireless control signal, SC, to each flash device for adjustment of the flash strength from each flash device 2, 2' according to the flash adjustment value, VA. As the flash adjustment value, VA, is the same for all groups, the remote control may send the flash adjustment value, VA, by broadcasting. This may be performed in a short time. The wireless control signal, SC, may also comprise information to the flashes to initiate a main flash with a strength according to according to the flash adjustment value, VA, and the user value, VU.

According to an embodiment the predetermined relationship between the pre-flash strength value, VPF, the flash adjustment value, VA, and the main flash strength value, VMF, is VMF=VPF+VA+VU. As described in the example above the pre-flash strength value, VPF, may for example be set to 3. The pre-flash strength value, VPF, may correspond to a flash strength a factor 27 below the maximum flash strength of each flash device. The user value can be adjusted in steps of the same size as the steps of the flash adjustment value. The remote control may also be configured to send at least one main flash control signal to said at least one group of flash devices, for initiating a main flash with a main flash strength, EMF, from each flash device, only when the sum of the flash adjustment value, VA, and the user value, VU, is equal to or less than the predetermined value, N, and when the sum of the adjustment value, VA, and the user value, VU, is larger than the predetermined value, N, to initiate an alert signal.

If the flash adjustment value received from the camera is 3.5, the user value is −1, the pre-flash strength value, VPF, is 3, the main flash strength value, VMF, will be VMF=VPF+VA+VU=3+3.5−1=5.5. The remote control may according to an example send a control signal to the flash devices to increase the flash strength by a factor 2VA+VU=22.5.

FIG. 1 also shows a mobile device 11. The remote control 1 may be configured for communication with the mobile device 11. Thus, the remote control may receive the user value VU from the mobile device 11. The remote control may also send information to the mobile device 11 such that all information on the display of the remote control is also shown on the mobile device.

The information displayed on the display remote control and possibly on the mobile device is not limited to the main flash strength value, VMF, but also other information such as the user value, VU, for each group of flash devices.

Use of a remote control for controlling at least one group of flash devices, can be done with flash devices, which all have a pre-flash strength corresponding to the pre-flash strength value, i.e., the predetermined number of steps below the maximum flash strength of each flash device, wherein each step corresponds to the predetermined factor, X.

Figure 2:
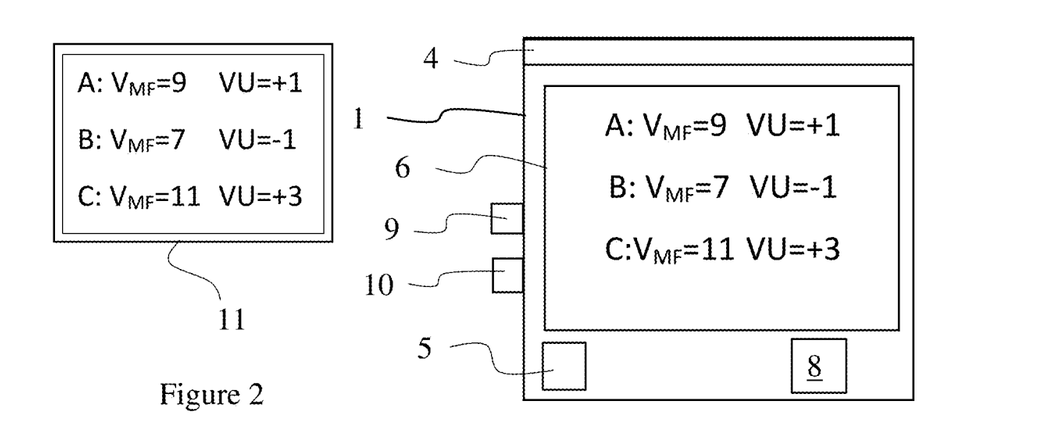
FIG. 2 shows in larger detail a remote control and a mobile device according to FIG. 1.

FIG. 2 shows a remote control 1 in larger detail. On the display is shown the calculated main flash strength value, VMF, for each group A, B, C, of flash devices (not shown). Also shown on the display are the user values VU for each group. The pre-flash strength value flash is set to 3 in the example shown in FIG. 2, the predetermined value N is set to 7, and the flash adjustment value received from the camera is 5. As can be seen in FIG. 2 the user value, VU, for group A is 1, the user value, VU, for group B is −1, and the user value, VU, for group C is 3. The predetermined relationship in this example is VMF=VPF+VA+VU. The resulting main flash strength value, VMF, for the groups A, B, C, is 9, 7, and 11, respectively. The sum of the flash adjustment value, VA, and the user value, VU, is below the predetermined value N, for groups A and B, but above the predetermined value N for group C. This results in that the displayed main flash strength value, VMF, is 9, 7, and 11, for groups A and B respectively. Optionally, instead of displaying 11 or additionally to displaying 11, an alert signal may be shown for group C in the form of the text ERR or a similar message. As is shown in FIG. 2 the information displayed on the display 6 of the remote control 1 has been sent to the mobile device 11 and is shown on the mobile device.

Figure 3:
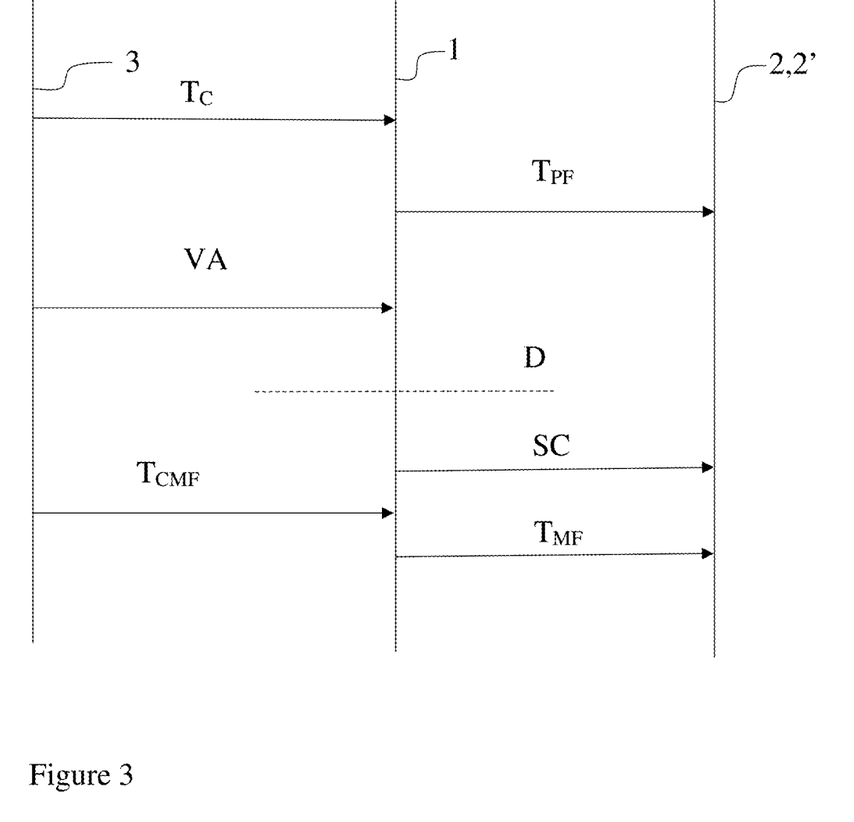
FIG. 3 is a flow diagram according to an embodiment showing the process that is executed by the camera, the flash devices and the remote control.

FIG. 3 is a flow diagram showing the process that is executed by the camera, the flash devices and the remote control. The time increases downwards in FIG. 3 and the first line represents the camera 3, the second line represents the remote control 1, and the third line represents the flash devices 2, 2'. In a first step, the camera 3 sends a trigger signal TC to the remote control 1. In a second step the remote control 1 sends a pre-flash trigger signal, TPF, to said at least one group of flash devices 2, 2', for initiating a pre-flash, PF, with a preset pre-flash strength, EPF, from the flash devices 2, 2'. In a third step the camera 3 sends a flash adjustment value, VA, to the remote control. The remote control 1, in a fourth step, D, displays the main flash strength value, VMF, on the display, and in a fifth step sends a wireless control signal, SC, to each flash device 2, 2', for adjustment of the flash strength from each flash device 2, 2' according to the flash adjustment value, VA. In a sixth step the camera transmits a main flash camera trigger signal TCMF indicating that it is ready to register an image. In a seventh step the remote control 1 sends a wireless main flash trigger signal, TMF, to the flash devices 2, 2', for initiating a main flash, MF, with the adjusted flash strength, from each flash device 2, 2'.

Figure 4:
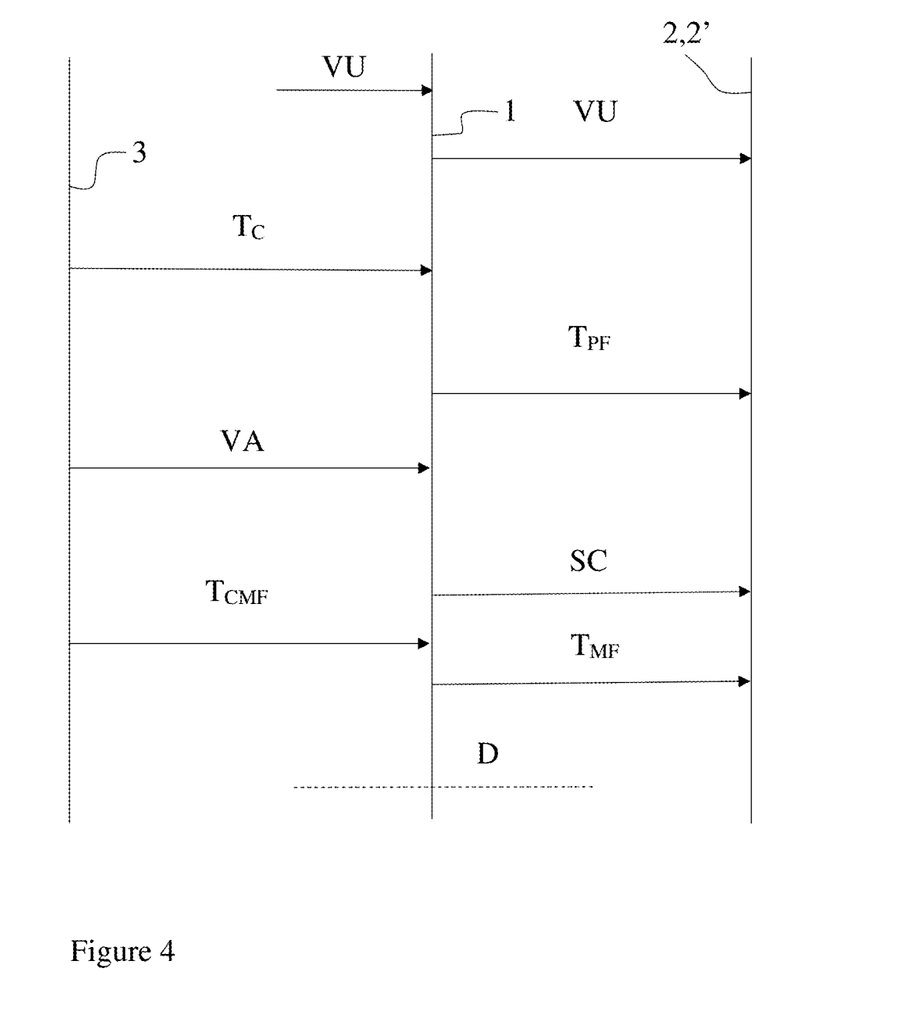
FIG. 4 is a flow diagram according to an embodiment showing the process that is executed by the camera, the flash devices and the remote control.

FIG. 4 is a flow diagram showing the process that is executed by the camera, the flash devices and the remote control according to an embodiment. The time increases downwards in FIG. 4 and the first line represents the camera 3, the second line represents the remote control 1, and the third line represents the flash devices 2, 2'. In a first step, a user inputs different user values, VU, for the different groups of flash devices 2, 2'. In a second step the remote control sends the different user values, VU, to the different groups of flash devices 2, 2'. The group and its corresponding user value, VU, has to be identified when sending the user values to the different groups of flash devices. The user values for all groups may be sent as one message using broadcasting. In a third step the camera 3 sends a trigger signal TC to the remote control 1. In a fourth step the remote control 1 sends a pre-flash trigger signal, TPF, to said at least one group of flash devices 2, 2', for initiating a pre-flash, PF, with a preset pre-flash strength, EPF, from the flash devices 2, 2'. The pre-flash trigger signal, TPF, can be sent using broadcasting. In a fifth step the camera 3 sends a flash adjustment value, VA, to the remote control. The remote control 1, in a sixth step sends a wireless control signal, SC, to each flash device

2, 2', for adjustment of the flash strength from each flash device 2, 2' according to the flash adjustment value, VA. In a seventh step the camera transmits a main flash camera trigger signal TCMF indicating that it is ready to register an image. In an eighth step the remote control 1 sends a wireless main flash trigger signal, TMF, to the flash devices 2, 2', for initiating a main flash, MF. The main flash is emitted with the adjusted flash strength, from each flash device 2, 2', taking into account the flash adjustment value, VA, as well as the user value for the respective groups of flash devices 2, 2'. As the user value for the respective groups was sent to the groups of flash devices already before the preflash the same information, i.e., the flash adjustment value, may be sent to the groups of flash devices 2, 2', using broadcasting. This shortens the time for sending information from the remote control 1, to the different groups of flash devices. This enables the main flash to be initiated within a short time after having received the flash adjustment value from the camera 3. In an eighth step the remote control displays, D, the main flash strength value, VMF, on the display. The main flash strength value could be displayed after reception of the flash adjustment value, VA, from the camera, according to the embodiment shown in FIG. 3 and described above.

If two flash devices are used both may be able to increase the flash strength by 7 steps from the preflash strength and decrease the flash strength by 2.9 steps from the preflash strength. If the preflash strength value, VPF, is set to 3, the maximum possible setting of the flash devices corresponds to a value of 10 and the minimum possible setting corresponds to a value of 0.1. A first of the flash devices may have a preflash strength of 1 Joule. The first flash device would then have a maximum flash strength of $1 \times 2^7 = 128$ Joule and a minimum flash strength of $1 \times 2^{-2.9} = 0.13$ Joule. A second of the flash devices may have a preflash strength of 10 Joule. The first flash device would then have a maximum flash strength of $10 \times 2^7 = 1280$ Joule and a minimum flash strength of $10 \times 2^{-2.9} = 1.3$ Joule. According to an embodiment, the remote control may be configured to display only values between 0.1 and 10, but the remote control may also display value, which are not possible to achieve with the flash devices.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, user interfaces, and algorithm steps described in connection with the embodiments disclosed herein can be implemented as electronic hardware, or combinations of electronic hardware and computer software. To illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks, user interfaces, and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. A processor can be a hardware processor, which can be one or more hardware processors configured to execute one or more instructions stored in memory to cause the system to perform the methods, processes, routines, functions, and/or algorithms discussed herein. A memory can store specific computer-executable instructions. The memory can be one or more memories, including one or more non-transitory memories, associated with each of the one or more hardware processors (e.g., MMU 504 and/or BMU 814). A hardware processor in communication with the memory can execute the specific computer-executable instructions to perform the methods, processes, routines, functions, and/or algorithms discussed herein. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device (controller), or in a combination of the two, that command, control, or cause the system(s) and associated components described herein to perform one or more functions or features of the method, process, routine, or algorithm. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

As an example, a computer system may be implemented in the various embodiments in the described subject matter.

The computer system can include a processor, main memory, storage, a bus, and input. The processor may be one or more processors. The processor executes instructions that are communicated to the processor through the main memory. The main memory feeds instructions to the processor. The main memory is also connected to the bus. The main memory may communicate with the other components of the computer system through the bus. Instructions for the computer system are transmitted to the main memory through the bus. Those instructions may be executed by the processor. Executed instructions may be passed back to the main memory to be disseminated to other components of the computer system. The storage may hold large amounts of data and retain that data while the computer system is unpowered. The storage is connected to the bus and can communicate data that the storage holds to the main memory through the bus.

Various embodiments and examples of assemblies have been disclosed. Although the assemblies have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above.

What is claimed is:

1. A remote control for controlling at least one group of flash devices for photography, the remote controller comprising:
    a display,
    wherein the remote control is configured:
        to send, after receiving a trigger signal $T_C$ from a camera, a wireless pre-flash trigger signal, $T_{PF}$, to the flash devices for initiating a pre-flash (PF) from the flash devices, wherein each flash device has a preset pre-flash strength, $E_{PF}$, and the sum of all pre-flash strengths, $E_{PF}$, corresponds to a total pre-flash strength $E_{TPF}$, and
        to receive from the camera, after sending the pre-flash trigger signal, $T_{PF}$, a flash adjustment value, VA, corresponding to the exponent in the relationship $E_{DMF} = E_{TPF} \cdot X^{VA}$, wherein $E_{DMF}$ is a desired sum of main flash strengths from the flash devices, and X is a predetermined factor,
        to determine a main flash strength value, $V_{MF}$, based on a pre-flash strength value, $V_{PF}$, stored in the remote control, the flash adjustment value VA, and a predetermined relationship between the pre-flash strength value, $V_{PF}$, the flash adjustment value, VA, and the main flash strength value, $V_{MF}$,
        to display the main flash strength value, $V_{MF}$, on the display,
        to send a wireless control signal, SC, to each flash device for adjustment of the flash strength from each flash device at least according to the flash adjustment value, VA, and
        to send a wireless main flash trigger signal, $T_{MF}$, to the flash devices, for initiating a main flash, MF, with the adjusted flash strength, from each flash device.

2. The remote control according to claim 1, wherein the predetermined factor, X, is 2.

3. The remote control according to claim 1, wherein the predetermined relationship between the pre-flash strength value, $V_{PF}$, the flash adjustment value, VA, and the main flash strength value, $V_{MF}$, is $V_{MF} = V_{PF} + VA$.

4. The remote control according to claim 1, further configured to initiate an alert signal when the flash adjustment value, VA, is larger than a predetermined value, N, stored in the remote control.

5. The remote control according to claim 1, further comprising a user interface, wherein the remote control is further configured:
    to receive, via the user interface, a user value, VU, for each group of flash devices, wherein each user value, VU, corresponds to the second exponent in the relationship $E_{AMF} = E_{PF} \cdot X^{VA+VU}$, wherein $E_{AMF}$ is a main flash strength for a flash device in a group, after adjustment with the flash adjustment value, VA, and the user value for the group,
    to determine, for each group of flash devices, a main flash strength value, $V_{MF}$, based on the pre-flash strength value, $V_{PF}$, the flash adjustment value VA, the user value VU for the group, and a predetermined relationship between the pre-flash strength value, $V_{PF}$, the flash adjustment value, VA, the main flash strength value, $V_{MF}$, and the user value, VU,
    to display the main flash strength value, $V_{MF}$, for each group, on the display, and
    to send a wireless control signal, SC, to each flash device for adjustment of the flash strength from each flash device according to the flash adjustment value, VA, and the user value, VU, for the group to which the flash device belongs.

6. The remote control according to claim 5, further configured to send the respective user value, VU, to each group of flash devices, before sending the wireless pre-flash trigger signal, $T_{PF}$, to the flash devices.

7. The remote control according to claim 5, wherein the remote control is configured for reception of the user value VU from a mobile device.

8. The remote control according to claim 5, wherein the predetermined relationship between the pre-flash strength value, $V_{PF}$, the flash adjustment value, VA, and the main flash strength value, $V_{MF}$, is $V_{MF} = V_{PF} + VA + VU$.

9. The remote control according to claim 5, wherein the remote control is configured to display on the display, for each group of flash devices, also the user value, VU.

10. The remote control according to claim 5, configured to initiate an alert signal when the sum of the flash adjustment value, VA, and the user value, VU, is larger than a predetermined value, N, for at least one group of flash devices.

11. The remote control according to claim 5, wherein the remote control is configured to set the pre-flash strength value, $V_{PF}$, based on input from a user via the user interface.

12. The remote control according to claim 1, further comprising a user interface, wherein the remote control is configured to set the pre-flash strength value, $V_{PF}$, based on input from a user via the user interface.

13. The remote control according to claim 1, wherein the pre-flash strength value, $V_{PF}$, is 3.

14. The remote control according to claim 1, wherein the remote control is configured to transmit to a mobile device the main flash strength value $V_{MF}$.

15. The remote control according to claim 4, wherein the predetermined value, N, is 7.

16. The remote control according to claim 1, wherein the sending of at least one main flash control signal, SC, to said at least one group of flash devices, comprises instructions to increase the flash strength from the preflash strength.

17. A method of using a remote control according to claim 1, the method comprising controlling at least one group of flash devices with the remote control, wherein all flash devices have a pre-flash strength corresponding to the pre-flash strength value $V_{PF}$ below the maximum flash strength of each flash device, wherein each step corresponds to the predetermined factor, X.

18. A system comprising a remote control according to claim 1 and at least one flash device having a pre-flash strength corresponding to the pre-flash strength value $V_{PF}$ below the maximum flash strength of each flash device, wherein each step corresponds to the predetermined factor, X.

19. The system comprising a remote control according to claim 18, wherein the pre-flash strength value $V_{PF}$ is a number of steps corresponding to a predetermined value N.

20. The method of using a remote control according to claim 17, wherein the pre-flash strength value $V_{PF}$ is a number of steps corresponding to a predetermined value N.

\* \* \* \* \*